(12) United States Patent
Buckelew et al.

(10) Patent No.: US 6,498,882 B1
(45) Date of Patent: Dec. 24, 2002

(54) ASSEMBLY AND METHOD FOR REORGANIZING PLANAR LIGHTWAVE CIRCUIT CHANNELS

(75) Inventors: Mark Buckelew, San Jose, CA (US); Johnny Zhang, Sunnyvale, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/724,951

(22) Filed: Nov. 28, 2000

(51) Int. Cl.$^7$ .................................................. G02B 6/44
(52) U.S. Cl. ...................... 385/114; 385/137; 385/120; 385/49; 385/50; 385/52
(58) Field of Search ................................ 385/134–137, 385/120, 121, 17, 114, 48, 50, 52

(56) References Cited

U.S. PATENT DOCUMENTS

| | | | |
|---|---|---|---|
| 3,920,432 A | 11/1975 | Smith | |
| 5,222,179 A * | 6/1993 | Auteri | 385/114 |
| 5,381,494 A * | 1/1995 | O'Donnell et al. | 385/49 |
| 5,471,555 A * | 11/1995 | Braga et al. | 385/136 |
| 5,600,750 A | 2/1997 | Beasley, Jr. et al. | |
| 5,692,086 A * | 11/1997 | Beranek et al. | 385/94 |
| 5,904,883 A | 5/1999 | Hattori et al. | |
| 5,943,455 A | 8/1999 | Travieso et al. | |
| 5,995,693 A | 11/1999 | Yang et al. | |
| 6,222,976 B1 * | 4/2001 | Shahid | 385/134 |
| 6,224,269 B1 * | 5/2001 | Engstrand et al. | 385/59 |
| 6,229,933 B1 * | 5/2001 | Curzio et al. | 385/17 |

* cited by examiner

*Primary Examiner*—Hemang Sanghavi
*Assistant Examiner*—Scott Knauss
(74) *Attorney, Agent, or Firm*—Amin & Turocy, LLP (57) ABSTRACT

This relates generally to an apparatus and method to provide a connection for distinct optical channels between at least two optical devices using multiple optical fibers where the connection may have a pre-selected and different channel order at either end of the connection.

38 Claims, 10 Drawing Sheets

ASSEMBLY AND METHOD FOR REORGANIZING PLANAR LIGHTWAVE CIRCUIT CHANNELS

FIELD OF THE INVENTION

This invention relates generally to an apparatus and method to provide a connection for distinct optical channels between at least two optical or electro-optical devices using multiple optical fibers where the connection may have a pre-selected and different channel order at either end of the connection.

BACKGROUND OF THE INVENTION

In many optical and electro-optical systems (e.g., computer systems, programmable electronic systems, telecommunication switching systems, control systems, and so forth) it is highly desirable to achieve a reliable connection of multiple optical fibers between optical devices. However, achieving such a reliable connection is often difficult. Minimizing the number of optical fiber splices and connections provides advantages because these splices and connections greatly reduce the reliability of the connection between the devices. Hereafter, the term "optical device" is intended to include devices used in the optical and electro-optical systems mentioned above.

Connecting optical devices may require connecting multiple channels between the devices. Each optical device may have a series of distinct optical channels each of which must be connected to a corresponding channel on another optical device. The optical fibers connecting two optical devices are usually incorporated into groups of optical fibers. These groups may be in the form of a ribbon. When connected to an optical device, each optical fiber in a ribbon corresponds to a particular optical channel on the device. For example, referring to FIG. 1, if the group 11 of optical fibers 10 was a ribbon connected to an optical device then each optical fiber 10 within the group 11 will correspond to a particular optical channel e.g., C1–C8 of the device. Also, it is inherent that the group 11 of optical fibers 10 has a respective optical channel order as illustrated by the order of C1–C8. As used throughout this application, the term "optical channel order" defines the order and location/sequence of each distinct optical channel which corresponds to a particular optical fiber in the group. In other words, the optical channel order functionally provides a map both for determining the optical channel that is connected to a fiber in a group, and for determining where that fiber is located with reference to the remaining fibers.

Figure 1:
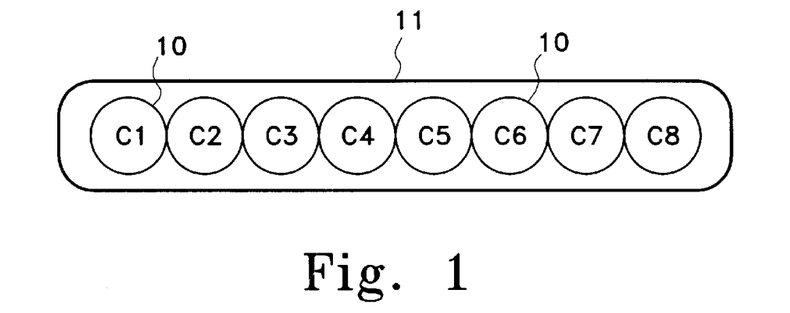
FIG. 1 illustrates an example of a standard optical channel order which contains optical fibers corresponding to certain channels.
Figure 2A:
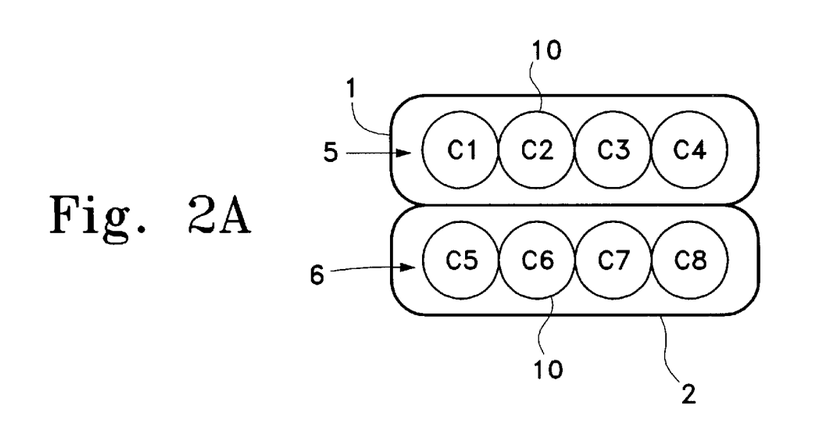
FIGS. 2A–2B illustrates additional examples of groups of optical fibers and the respective optical channel orders.

For example, referring to FIG. 1, group 11 is shown with an optical channel order where each optical fiber 10 corresponds to one of channels C1, C2, C3, C4, C5, C6, C7, and C8 in the order and position shown. In comparison, as shown in FIG. 2A, group 1 has an optical channel order 5 where each optical fiber 10 corresponds to one of channels C1, C2, C3, and C4. FIG. 2A also illustrates group 2 as having an optical channel order 6 where each optical fiber 10 corresponds to one of channels C5, C6, C7, and C8.

It is to be understood that the number of optical channels discussed herein is not limited to the number illustrated in the drawings. The number of optical channels may range from 1 to the number required by any particular optical device. For example, a device may have 8, 16, 40, 80, or more optical channels. Moreover, optical channels C1–C8 do not necessarily correspond to channels 1–8 of an optical device. Instead, the use of C1–C8 are simply intended to serve as identifiers for reference purposes.

The development of optical devices with an increasing number of optical channels presents challenges in addition to the need for a reliable optical connection as described above. For instance, it is difficult to physically accommodate an increasing number optical fibers while simultaneously minimizing the space occupied by the optical device. One way of addressing this problem is to reconfigure an optical fiber ribbon to fit more optical fibers within a smaller area. However, reconfiguring the optical fibers in a ribbon will re-arrange the channel order of the ribbon from the proximal end to the distal end of the ribbon. The re-arranged channel order results in an undesirable channel order at the distal end of the ribbon. The problem is significant since suppliers usually sell the optical device with a ribbon already attached. Therefore, in order for a customer to properly connect the ribbon to a second optical device, it is necessary to re-arrange the channel order on distal end of the ribbon. For example, if a first optical device requires a channel order as shown by FIG. 1 and a second optical device requires a channel order as shown by FIG. 2A, but the re-configured ribbon attached to the first device has a channel order as illustrated FIG. 2B, then additional reordering of the optical fibers is required.

Three common solutions for overcoming these problem are described as follows:

(1) Customers can design their systems or devices with a particular channel order at the input/output of the device and use multi-fiber connectors or direct ribbon splices to prevent a mismatch of the channel orders. However, at the time of the filing of this application, there is no discernable industry standard for a channel order for multiple-fiber connectors. The lack of an industry standard may force the customer to change the configuration of their system to accommodate a specific channel order. However, not all customers are able to change the configuration of their system not all customers can change the configuration of their existing systems to accommodate the multiple-fiber connectors. Moreover, it may be difficult to retrofit older systems may to accommodate devices having differing channel orders.

(2) A connector assembly can be spliced onto the input/output fiber ribbon. The connector assembly separates the individual fibers and attaches a connector to each fiber. One drawback to this solution is that splicing a connector assembly onto a fiber ribbon introduces additional splices or connections into the system. These additional splices or connections result in higher insertion loss (signal loss) and, therefore, reduced system performance.

(3) The individual fibers on a reconfigured ribbon of optical fibers may be separated from the ribbon. A connector is then attached to each fiber. However, attaching multiple connectors directly onto individual output/input fibers causes an excessive scrap rate of devices, increases manufacturing time resulting in excessive product lead times, and eventual results in excessive costs for manufacturing the product.

Another solution to the problem discussed above is to re-sequence the ribbon extending away from the first optical device to produce a channel order that is required by the customer. This is accomplished by separating the individual fibers from the ribbon(s) extending away from the first optical device. The individualized fibers are often referred to as "singulated" fibers. Then, the individual fibers are re-sequenced to produce the customer-desired channel order. Next, the re-sequenced fibers are re-ribbonized at the customer-end. Therefore, the customer may splice the fibers to a separate connector assembly to connect the device to their system. Alternatively, the re-ribbonized fibers may be supplied with a connector. While the re-ribbonized fiber may be a desirable solution for some, it may not satisfy the needs of every customer. For example, given the limitations of re-ribbonizing numerous singulated fibers, the re-ribbonized portion may be of a different size than a ribbon that is typically used in the industry. The re-ribbonized fibers may also differ in other characteristics from a standard ribbon such as not being as robust, or not being as flexible. Accordingly, certain customers may require an optical device and ribbon where the channel order matches the customer's required channel order and the ribbon is not re-ribbonized. Moreover, customers may prefer to directly splice the ribbon from the optical device to their system and may not prefer to use a device with re-ribbonized fibers at the customer-end. Therefore, to address these situations, customers may desire an optical device having an ordinary (or industry standard) ribbon of optical fibers extending away from the device where the ribbon has a customer-desired channel order at the distal end of the ribbon.

There is currently a need to overcome the problems described above. More specifically, while a need remains for maximizing the number of optical fibers and reducing the space occupied by the fibers, there also remains a need to provide an optic fiber ribbon with a customized channel configuration. Such an improved fiber ribbon should minimize the number of connectors and should eliminate the need for the customer to work with the re-ribbonized end of the ribbon.

SUMMARY OF THE INVENTION

The invention provides a method and device for selectively reorganizing multiple optical fibers in a ribbon configuration without breaking the optical fibers. The invention also provides an optical system having an optical device connected to a reorganized ribbon of optical fibers.

A first aspect of the invention is directed to an optical system comprising an optical device having a series of distinct optical channels, each of which is connected to a cable assembly.

The cable assembly may comprise a proximal cable portion having a proximal end, a distal cable portion having a distal end, and a transition region separating the proximal portion and distal portion. Each of the optical fibers of the present invention may comprise a core surrounded by a cladding and an outer coating surrounding the cladding along a portion of a length of the fiber. Each of the optical fibers within a cable assembly of the present invention may correspond to a distinct channel. The cable assembly may also comprise a proximal optical connecting region located at the proximal cable portion and adapted to connect the fiber cores to the first optical device. In the proximal optical coupling region the plurality of the optical fibers may be grouped into at least one sub-plurality of optical fibers, where each sub-plurality has a proximal optical channel order defined by the order and position of the optical channel corresponding to each of the optical fibers in the sub-plurality. The cable assembly may also comprise a distal optical connecting region located at the distal portion, wherein in at least a portion of the distal optical connecting region the plurality of optical fibers form at least one ribbon of optical fibers, and wherein each of the ribbons has a distal optical channel order defined by the order and position of the optical channel corresponding to each of the optical fiber in the ribbon.

The cable assembly may also has a transition region of where the plurality of optical fibers are re-ordered from the distal cable portion to the proximal cable portion so that each of the proximal and distal channel orders are different. The transition region may be placed within an enclosure of the optical system.

The invention also includes a method of connecting a first and second optical devices using a ribbon having a proximal end and a distal end and a plurality of optical fibers extending therethrough, the method comprising the acts of removing the plurality of optical fibers from the ribbon at the proximal end of the ribbon; re-ordering the plurality of optical fibers between the proximal and distal ends such that each fiber is in a different from its position in the ribbon; separating said plurality of optical fibers into at least two groups of optical fibers at said proximal end, and connecting each of said optical fibers to said first optical device; re-ribbonizing at least one portion of said proximal end of optical fibers; and connecting the distal end of the ribbon to the second optical device.

The re-ribbonizing step may comprise joining the fibers with a material selected from the group consisting of: tape, polymer, glass, epoxy and metal. The separating step may include interleaving the optical fibers.

These and other objects and advantages of the invention will become apparent to those skilled in the art from the following detailed description of the invention and the accompanying drawings.

BRIEF DESCRIPTION OF THE DRAWINGS

FIGS. 3A–3E illustrate examples of optical fibers connected to fiber arrays.

FIGS. 3B–3C illustrate an optical fiber connected to a fiber array.

DETAILED DESCRIPTION OF THE INVENTION

It is noted that the drawings are intended to illustrate the concepts presented herein. As such, unless otherwise noted, any scale or dimensional feature presented by the drawing is for illustrative purposes only.

For purposes of discussion herein, the term "package" refers to an enclosure containing an optical device. The term "fiber array" refers to a connector of the optical device that aligns the optical fibers with optical channels or waveguides of the optical device. Fiber array may also be referred to as a fiber array block. The first optical devices referred to herein may be any optical device which requires an input/output having a series of distinct optical channels. One example of an optical device is a 1×N planar lightwave circuit (PLC) which can be used either to demultiplex a single input into multiple output signals or to multiplex multiple signal inputs into a single output. The PLC will have one or more waveguides connected to a fiber array at an input/output of the device.

Figure 3A:
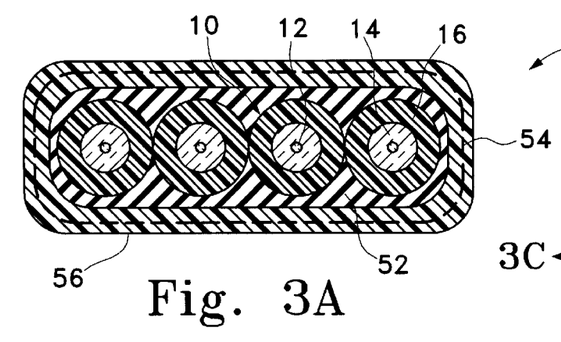
FIG. 3A illustrates a cross sectional view of an optical fiber in a fiber ribbon.

FIGS. 3A–3E illustrate examples of optical fibers connected to fiber arrays. In these illustrations it is assumed that the fiber array is already configured to match the spacing of optical channels or waveguides 9 on an optical device. FIG. 3A illustrates a cross-sectional view of a ribbon 50 having several optical fibers 10. The optical fibers 10 within the ribbon 50 may be joined by a binding material 52. Some ribbons may have one or more layers of a reinforcing layer 54, such as Kevlar, surrounding the binding material 52 to provide additional protection for the fibers 10 in the ribbon 50. A ribbon 50 may also have a jacket material 56 surrounding the reinforcing layer 54 and binding material 52 keeping the fibers 10 in ribbon-form. Each optical fiber 10 typically has a core 12 surrounded by a cladding 14, where the core 12 and the cladding 14 each have a different index of refraction. The cladding 14 of the fiber 10 is surrounded by a coating 16. The coating 16 of the fiber 10 provides a structural reinforcement for the relatively more fragile core 12 and cladding 14. This coating 16 may be an acrylic material and may be color-coded based upon the respective channel to which the fiber 10 is connected. It is therefore desirable to maintain the coating 16 on as much as the optical fiber 10 as possible to provide additional protection to the core 12 and cladding 14 of the optical fiber 10.

Figure 3B:
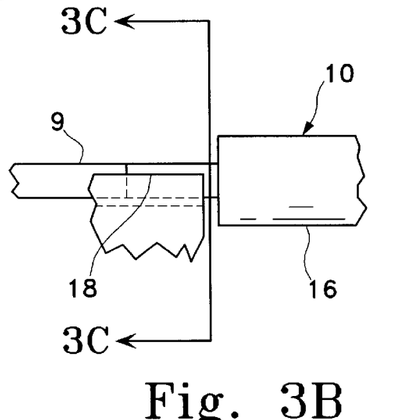

FIG. 3B illustrates an example of a fiber 10 connected to an array 18. The array 18 connects the fiber 10 to the optical channel or waveguide 9 of the optical device (not illustrated.) In order to connect the optical fiber 10 to the array 18, the fiber 10 is separated or singulated from the ribbon (not shown.) Next, the fiber coating 16 is removed from a portion of the fiber 10 leaving only the cladding 14 attached to the array 18. It is noted that the fiber 10 may have some type of fixture or material (not shown) to aid in maintaining the connection of the fiber 10 to the array 18. However, for purposes of clarity, the fixture or material is not illustrated.

Figure 3C:
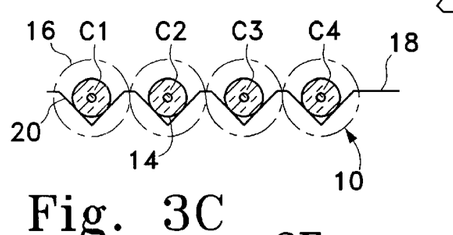

FIG. 3C illustrates one example of attaching optical fibers 10 to a fiber array 18. FIG. 3C is a cross sectional view of the optical fiber 10 attached to the array 18 taken along the line 3C—3C from FIG. 3C. The optical fiber 10 may be placed into a groove 20 of the fiber array 18. In this illustration, the fiber array 18 contains 4 optical channels denoted as C1, C2, C3, and C4. It is understood that the number of channels may be as few as 2 or as many as required by the respective optical device. Since the fiber coating 16 is removed from a portion of the fiber 10, only the cladding 14 of the fiber 10 is nested in the groove 20. However, FIG. 3C illustrates the inefficient spacing of the optical fibers 10 as the coating 16, being of a larger diameter than the cladding 14, dictates the spacing of the fibers 10.

As mentioned above, as optical devices require an increasing number of channels, inefficient spacing of the optical fibers 10 results an increasing amount of space for the package. At the time of filing of this application, the outer diameter of the optical fiber 10 across the fiber coating 16 is approximately 250 μm. Therefore, the pitch of optical fibers 10 and optical channels C1–C4 in a fiber array 18 of the configuration illustrated in FIG. 3C is approximately limited to the diameter of the optical fiber used. The term pitch is meant to define the distance between successive fibers arranged similarly between two points on a surface or part In this case, the pitch is limited to approximately 250 μm.

Figure 3D:
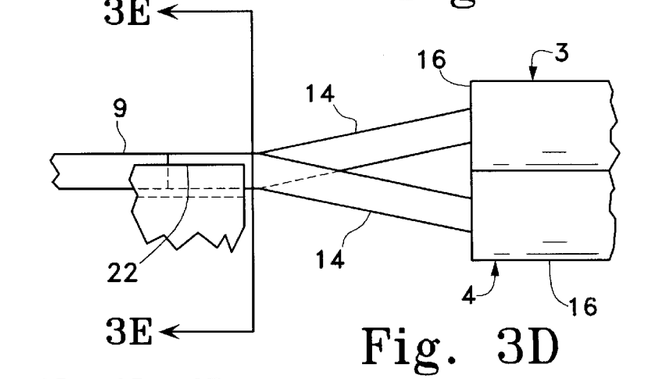
FIGS. 3D–3E illustrate a reconfigured optical fiber connected to a fiber array.
Figure 3E:
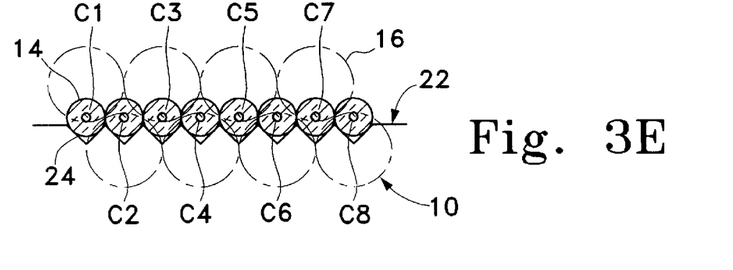

FIGS. 3D–3E illustrates an improved example of multiple fibers 10 connected to a fiber array 22 in which the fibers 10 are more efficiently spaced on the fiber array 22. As illustrated in FIG. 3D, the increase in efficiency of the optical fiber 10 spacing is the result of interleaving or vertically separating adjacent optical fibers 10. In the example illustrated in FIG. 3E, the pitch of the fibers 10 is reduced from the pitch of the array 18 shown in FIG. 3C. Again, the fiber coating 16 is removed from the fiber 10, leaving only the cladding 14 to be attached to the fiber array 22. However, interleaving the optical fibers 10 as they extend away from the fiber array 22 permits a reduction in the pitch of the fiber array 22. The pitch may be determined by the diameter of the cladding 14 as long as the diameter of the fiber coating 16 is not larger than twice the diameter of the cladding 14. In this example, the fiber array 22 accommodates 8 optical channels and optical fibers C1, C2, C3, C4, C5, C6, C7, and C8, while minimizing the space required for the fibers. As noted above, the number of channels is not limited to what is illustrated. Instead, the illustration of the channels C1–C8 is intended to demonstrate the ability to decrease the pitch of the optical fibers 10.

At the time of filing of this application, the outer diameter of the cladding 14 of the commercially standard optical fiber is approximately 125 μm. Therefore, the pitch of optical fibers 10 and optical channels C1–C8 in a fiber array 22 of the configuration illustrated in FIG. 3E is approximately limited to the diameter of the cladding of the optical fiber used. In this case, since the diameter of the coating is approximately 250 μm, or twice the diameter of the cladding 14, the pitch is limited to approximately 125 μm. However, it should be noted that the invention described herein may be used with optical fibers of any dimension.

Figure 4:
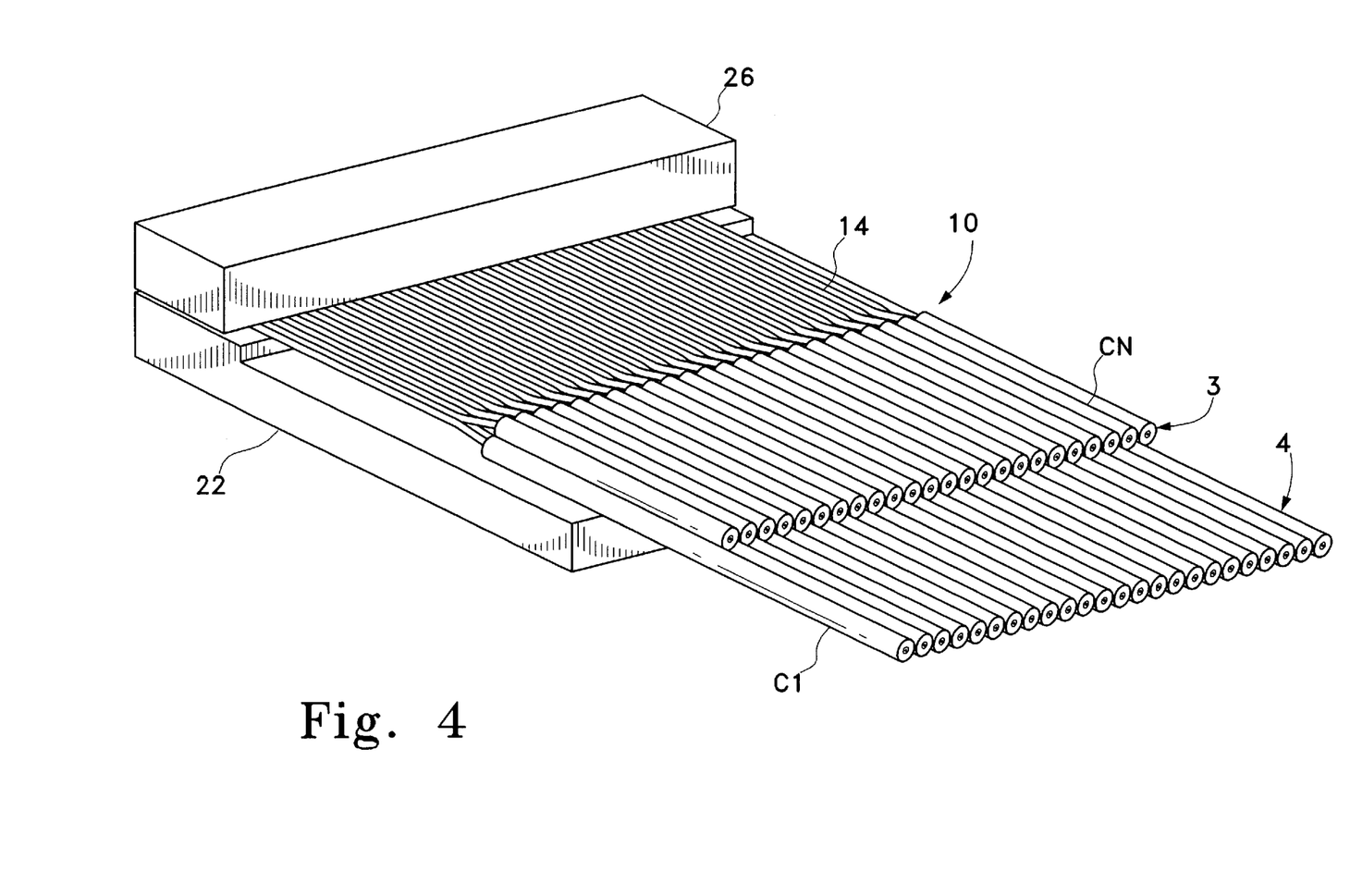
FIG. 4 illustrates a perspective view of reconfigured fibers connected to a fiber array.

A drawback to interleaving the optical fibers 10 is that as the optical fibers 10 separate, they form distinct groups 3, 4 of optical fibers 10 where each group 3, 4 has a separate channel order. As illustrated in FIG. 4, as the optical fibers 10 separate in to a top group 3 and a bottom group 4, each group contains optical fibers 10 associated with distinct channels C1 through CN. FIG. 4 also illustrates the use of a block of material 26 to "sandwich" the optical fibers 10 in the fiber array 22. The block 26 material may comprise, for example, an acrylate, glass, or silicone material, or a combination thereof. Referring back to FIG. 2B and FIG. 3D, it is readily discernable that as the optical fibers 10 separate into a top group 3 and a bottom group 4, the top group 3 contains a channel order 7 consisting of odd-numbered channels (C1, C3, C5, and C7), while the bottom group 4 contains a channel order 8 consisting of even-numbered channels (C2, C4, C6, and C8).

Figure 2B:
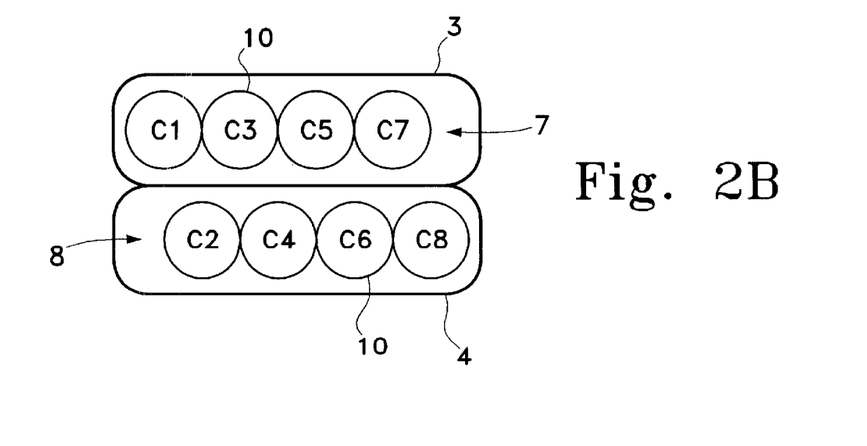

For the reasons described above, it is desirable to re-arrange the channel order of interleaved optical fibers to match a customer required channel order. For instance, if the reconfigured interleaved optical fibers have the channel order 7, 8 as shown in FIG. 2B on one side of the optical fiber assembly, it may be desirable to reorganize the channel order on the other side of the optical fiber assembly to match the channel order 5, 6 shown in FIG. 2A. Doing so provides the benefit of having a optical fiber assembly with interleaved fibers, thus minimizing package size and more efficiently uses the space inside the package as well, as well as providing the customer with the desired channel order.

Figure 5:
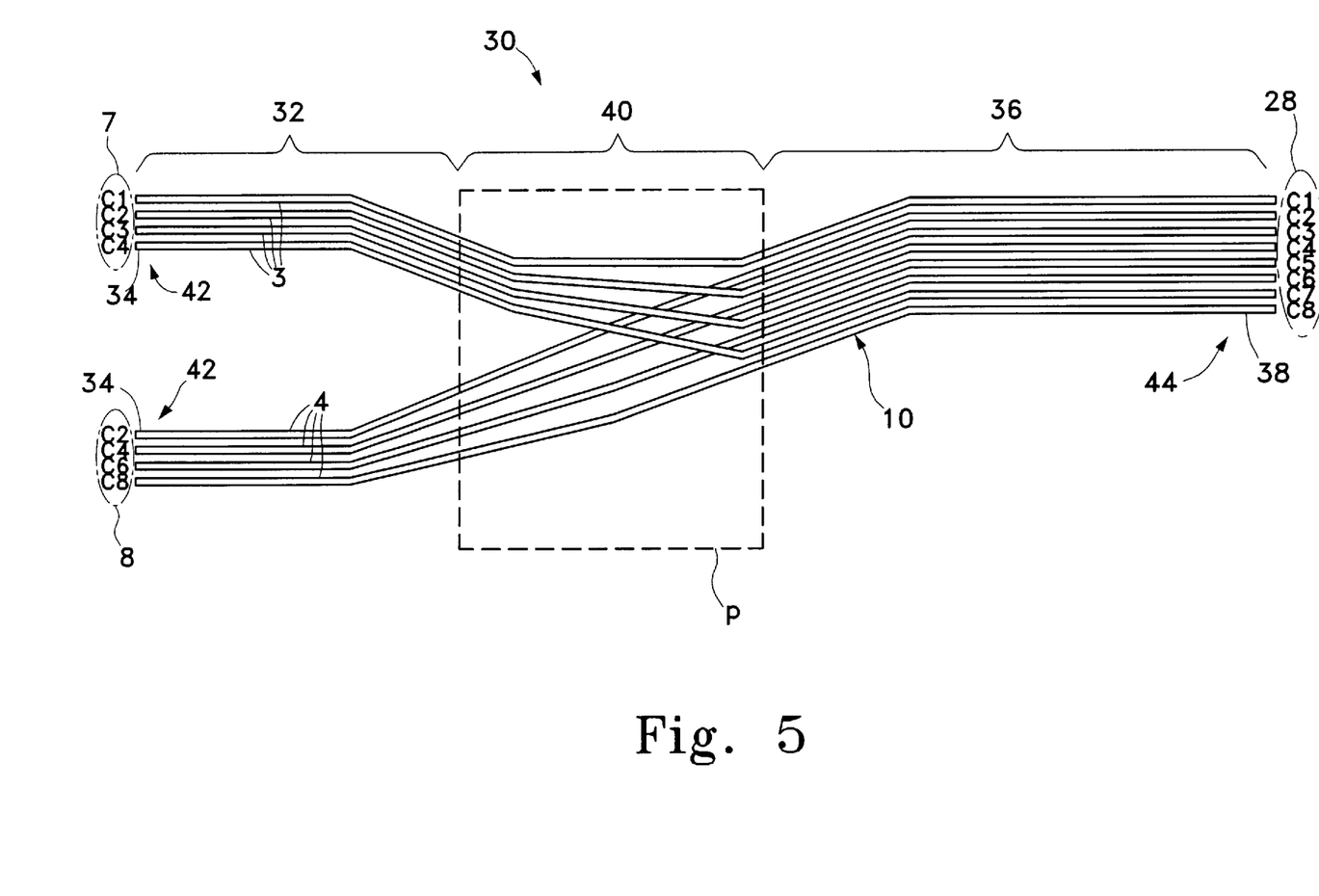
FIG. 5 illustrates a schematic representation of a variation of a cable assembly of the present invention.

FIG. 5 illustrates a schematic representation of a variation of a cable system of the present invention. The cable system comprises a cable assembly 30 connected to an optical device (not shown) where the cable assembly 30 comprises a proximal cable portion 32 having a proximal end 34, a distal cable portion 36 having a distal end 38, and a transition region 40 separating the proximal portion 32 and distal portion 36. The cable assembly 30 includes a plurality of optical fibers 10 extending from the proximal end 34 to the distal end 38 of the assembly 30. The proximal cable portion 32 includes a proximal optical connecting region 42 that is adapted to directly connect the plurality of optical fibers 10 to a first optical device (not shown). As mentioned above, connection of the optical fibers 10 to a fiber array (not shown) may require the removal of the fiber coating along a portion of the proximal optical connecting region 42.

In the variation illustrated in FIG. 5, the proximal cable portion 32 is grouped into two sub-pluralities 3, 4 of optical fibers 10. It is contemplated that a cable assembly of the present invention may have any number of sub-pluralities of optical fibers as needed. Each sub-plurality 3, 4 of optical fibers 10 has a distinct proximal optical channel order 7, 8. As noted above, an optical channel order is defined by the distinct optical channel corresponding to each optical fiber in the sub-plurality. Therefore, the proximal optical channel order 7 for sub-plurality 3 consists of channels C1, C3, C5, C7. Likewise, the proximal optical channel order 8 for sub-plurality 4 consists of channels C2, C4, C6, C8. As shown above, the sub pluralities 3, 4 may be formed by separating or interleaving the optical fibers 10. It is also contemplated, that the invention may include a single sub-plurality of fibers. In such a case, the fibers may not be separated, rather, they will simply be reordered in the transition region 40.

The distal portion 36 of the cable assembly 30 includes a distal optical connecting region 44 that is adapted to be connected to a second optical device (not shown). It is intended that the term "second optical device" includes a connector, splice, or other joining apparatus or device, or even another electro-optical device that is part of another electro-optical system. The plurality of optical fibers 10 at the distal optical connecting region 44 may form at least one ribbon of optical fibers (not shown) wherein each ribbon has a distal optical channel order 28. The distal optical channel order 28 illustrated in FIG. 5 consists of channels C1, C2, C3, C4, C5, C6, C7, and C8. It should be noted that if the sub-pluralities 7, 8 of optical fibers of the proximal optical connecting region 32 were simply placed together, given their channel orders 7, 8, the resulting channel order would be C1, C3, C5, C7, C2, C4, C6, and C8. As discussed above, this latter channel sequence presents significant problems.

However, the cable assembly 30 of the present invention contains a transition region 40 in which the plurality of optical fibers 10 are re-arranged or re-ordered to obtain the desired channel order 28 at the distal optical connecting region 44. For example, the optical fibers 10 may be re-ordered so that each optical fiber 10 corresponding to a distinct optical channel is re-directed from its proximal optical channel order 7, 8 to the distal optical channel order 28. The transition region 40 may be covered with a binding material such as an epoxy, polymer, metal alloy, or a polyimide material such as Kapton. The binding material may also be any flexible material. In another variation, the transition region 40 may also contain a supporting structure to further strengthen the optical fibers 10.

Moreover, the invention provides an optical system having a distal portion 36 that does not require reorganizing the fibers 10 therefore the distal cable portion will be similar to a standard fiber optic ribbon. This configuration, prevents the customer from having to work with re-sequenced or re-ribbonized optical fibers. As noted above, customers may desire an optical device with a standard ribbon for implementation into their systems.

In another variation of the invention, the transition region 40 may be sized such that it remains within a package of the first optical device (not shown) but illustrated by the box marked P in FIG. 5. One advantage for maintaining the transition region within a package is that the package provides an additional measure of protection to the re-organized fibers. As discussed below, the cable assembly of the present invention may also be used with a hermetically sealed package. Also, if at least the proximal cable portion 32 and the transition region 40 are placed within a package, then the distal cable portion 36, already having the desired distal channel order 28, may leaves the package having the form of a standard ribbon, thereby providing structural reinforcement and rigidity for the optical fibers 10. However, it is also contemplated that the transition region 40 may be placed outside of the package.

Figure 6A:
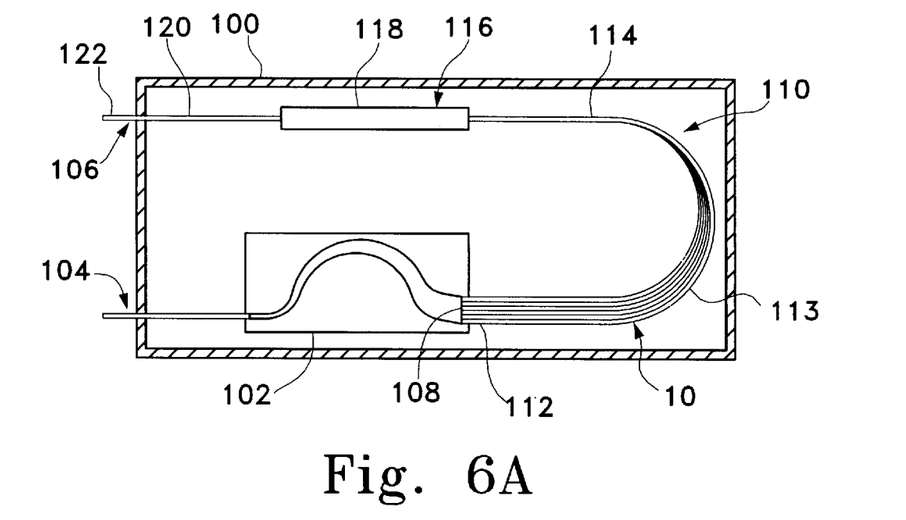
FIGS. 6A–6B illustrate examples of a cable assembly of the present invention within an enclosure containing an optical device.
Figure 6B:
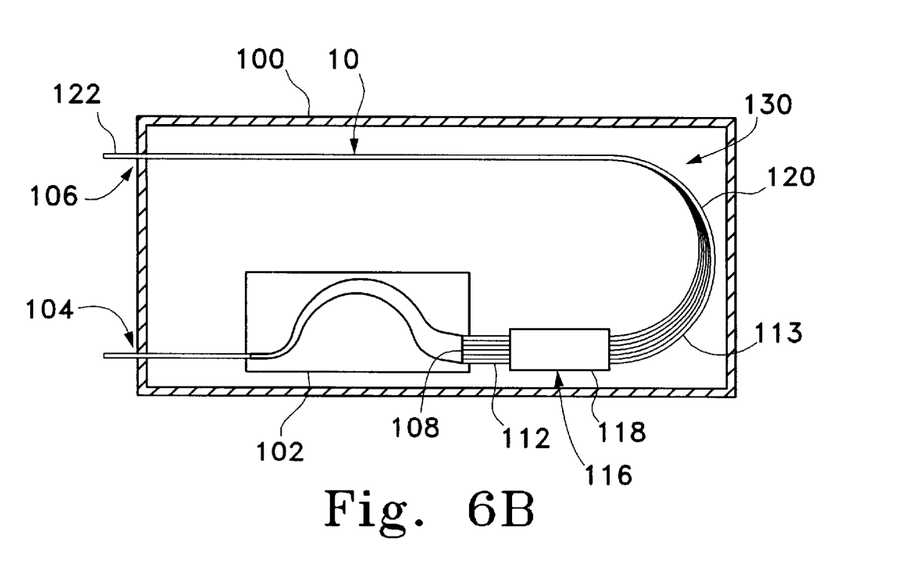

Other variations of the invention include ribbonizing portions of a proximal portion of the cable assembly as needed for the particular use. It is contemplated that the distal portion will remain in a configuration similar to a ribbon typically used in the industry. While the fibers at the distal portion may be removed from the ribbon, the distal portion will not require re-ribbonizing or ribbonizing. For example, each sub-plurality of optical fibers at a proximal cable portion may be ribbonized as they leave the fiber array. The individual fibers would then be re-ordered in the transition region. For example, variations of the invention are illustrated in FIGS. 6A and 6B. It should be noted that these illustrations are simply variations of possible configurations of the invention described herein. Other variations are considered to be within the scope of this disclosure as well.

FIG. 6A illustrates an example of a first optical device 102 within a package 100. The package 100 contains two connections 104, 106 which serve as input/output depending upon the optical device. Usually, the fibers connected to 106 will be in a ribbon form. In this example, the first optical device 102 is a PLC. The waveguides (not shown) of the optical device 102 are connected to a fiber array 108. The fiber array 108 is connected to a cable assembly 110 of the present invention at a proximal optical connecting region 112 located on a proximal cable portion 114 of the assembly 110. The channel orders or sub-pluralities of optical fibers 10, as illustrated elsewhere, are not shown in FIG. 6A. The individual optical fibers 10 may or may not be ribbonized throughout the proximal optical connecting region 112 and the proximal cable portion 114. (Note, the ribbonized fibers are not illustrated). Alternatively, the individual optical fibers 10 may be ribbonized along a portion of the proximal optical connecting region 112 and/or the proximal cable portion 114.

In the variation illustrated in FIG. 6A, the input/output 104, 106 exit from the same side of the package as a result of a bend 113 in the cable assembly 110. The variation of FIG. 6A also illustrates a package variation having a "vertical exit." In this variation, the cable assembly 110 rotates so the orientation of the optical fibers 10 is eventually perpendicular to the plane of the fiber array 108. The rotation of the fibers may or may not coincide with the bend 113. Accordingly, for these variations it may be desirable to leave a portion of the optical fibers 10 in the proximal optical connecting region 112 and/or the proximal cable portion 114 as individual fibers. Leaving the fibers individualized imparts less stress as the fibers bend and are routed from the transition region 116 to the fiber array 108.

In the example illustrated in FIG. 6A, the transition region 116 of the cable assembly 110 remains within the package 100. As mentioned herein, the transition region 116 may contain a binding material or structure 118 as described herein. The binding material 118 may be attached to the package 100 to provide additional structural rigidity for the fibers or to prevent movement of the fibers within the transition region 116.

A distal cable portion 120 is adjacent to the transition region 116 and exits from the package 100. The distal cable portion 120 may terminate at a distal optical connecting region 122 which may be connected to a second optical device (not shown). As described above, the distal cable portion 120 will be a ribbon, usually having the characteristics of a ribbon that is typically used in the industry.

FIG. 6B illustrates other configuration of a cable assembly 130 of the present invention. In this variation, a transition region 116 of the assembly 130 is placed close to a fiber array 108 of the first optical device 102 and prior to a bend 113 in the cable assembly 130. In this variation, the distal cable portion 120 and/or the distal optical connection region 122 may contain a bend 113 and rotation to accommodate the package 100 in having a "vertical exit" and input/output 104, 106 on the same side of the package 100. Again, the distal cable portion 120 will be in the form of a ribbon that is similar or the same as those typically used in industry.

Figure 6C:
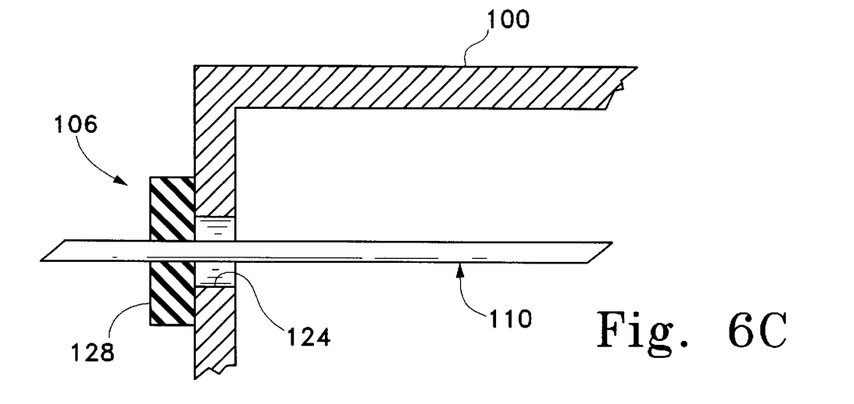
FIGS. 6C–6E illustrate sectional views of examples of a cable assembly of the present invention exiting from an enclosure.
Figure 6D:
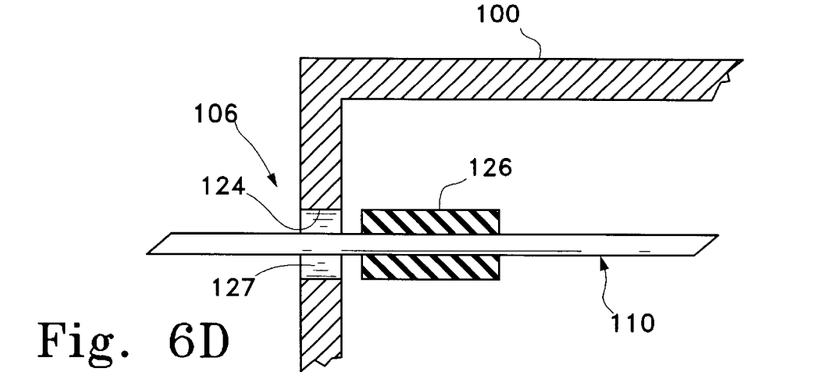
Figure 6E:
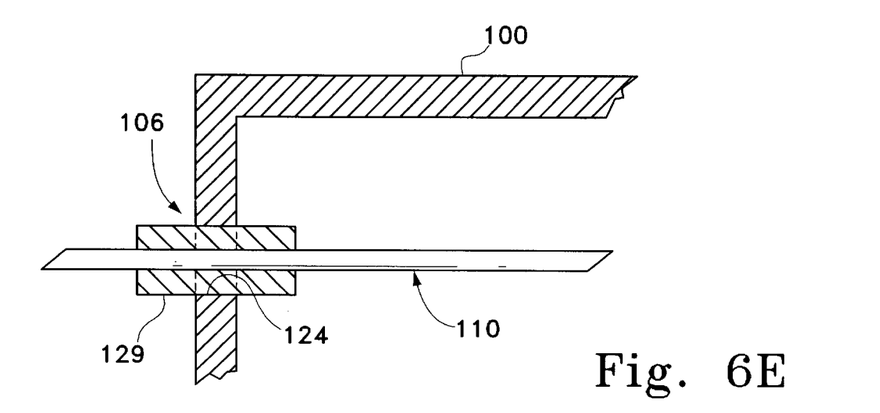

FIGS. 6C–6E illustrate sectional views of examples of a cable assembly of the present invention exiting from an enclosure. As illustrated in FIG. 6C, the cable assembly 110 of the present invention may exit from the package 100 via a feedthrough 124 located in a wall or side of the package 100. FIG. 6D illustrates a cable assembly 110 which is clamped 126 in a region adjacent to the feedthrough 124 or the clamp may extend through the package via the feedthrough (not shown). In another variation, the feedthrough may contain a compliant insert 127 which provides an additional measure of protection for the optical fibers. The insert 127 may be, but is not necessarily, used with a clamp, or any other variation discussed herein. One example of a compliant insert 127 is a silicone insert, or an epoxy. In another variation, as shown in FIG. 6C, an external stress relief 129, such as an epoxy or other material, maybe used where the cable assembly 110 passes through the wall. In the various examples, the use of an insert or epoxy in the feedthrough 124 may provide a quasi-hermetic seal. Such a seal will provide lesser protection to the interior of the package than a true hermetic seal. The stress relief 128 may be used on either side of the wall.

FIG. 6E illustrates a feedthrough 124 which has a hermetical seal 129. As discussed herein, the feedthrough may be hermetically sealed 129 to prevent outside elements from entering the package. The actual hermetic seal 129 may comprise a metallic seal, such as a solder, or the hermetic seal 129 may be an expoxy. The hermetic seal 129 may be outside the package, within the package, or extend through a wall or side of the package. The hermetic seal 129 may be placed on any portion of the cable assembly. Regardless of where the hermetic seal 129 is placed, the cable assembly and ribbon must be prepared to accommodate the hermetic seal. One such example is found in U.S. patent application Ser. No. 09/654,459 filed Sep. 1, 2000, titled APPARATUS AND METHOD TO METALLIZE, REINFORCE, AND HERMETICALLY SEAL MULTIPLE OPTICAL FIBERS the entirety of which is incorporated by reference herein.

It is also contemplated that a cable assembly of the present invention may be used with packages in which the input/output 104, 106 to exits from any side (opposite or adjacent) and package not having "vertical exits." Accordingly, the cable assembly may undergo a bend of anywhere from 0 degrees to 180 degrees or greater if required. In any case, it is important to maintain flexibility of the optical fibers within a package. Also, although FIGS. 6A and 6B illustrate the transition region 116 as being next to the PLC 102 or towards input/output 106, the transition region 116 may be placed anywhere. For example, a variation of the present invention may include an optical device within a package with the transition region outside of the package. Accordingly, for this variation, the size of the package could be extremely minimized. Moreover, an optical system of the present invention may be used with a package that is hermetically sealed. As such, the cable assembly of the optical system may be configured to accommodate the hermetic seal. For example, to prepare for a hermetic seal, the individual fibers may be separated or exposed from the ribbon in the distal cable portion which exits a package, however the coating may still be attached to the fibers.

Figure 7A:
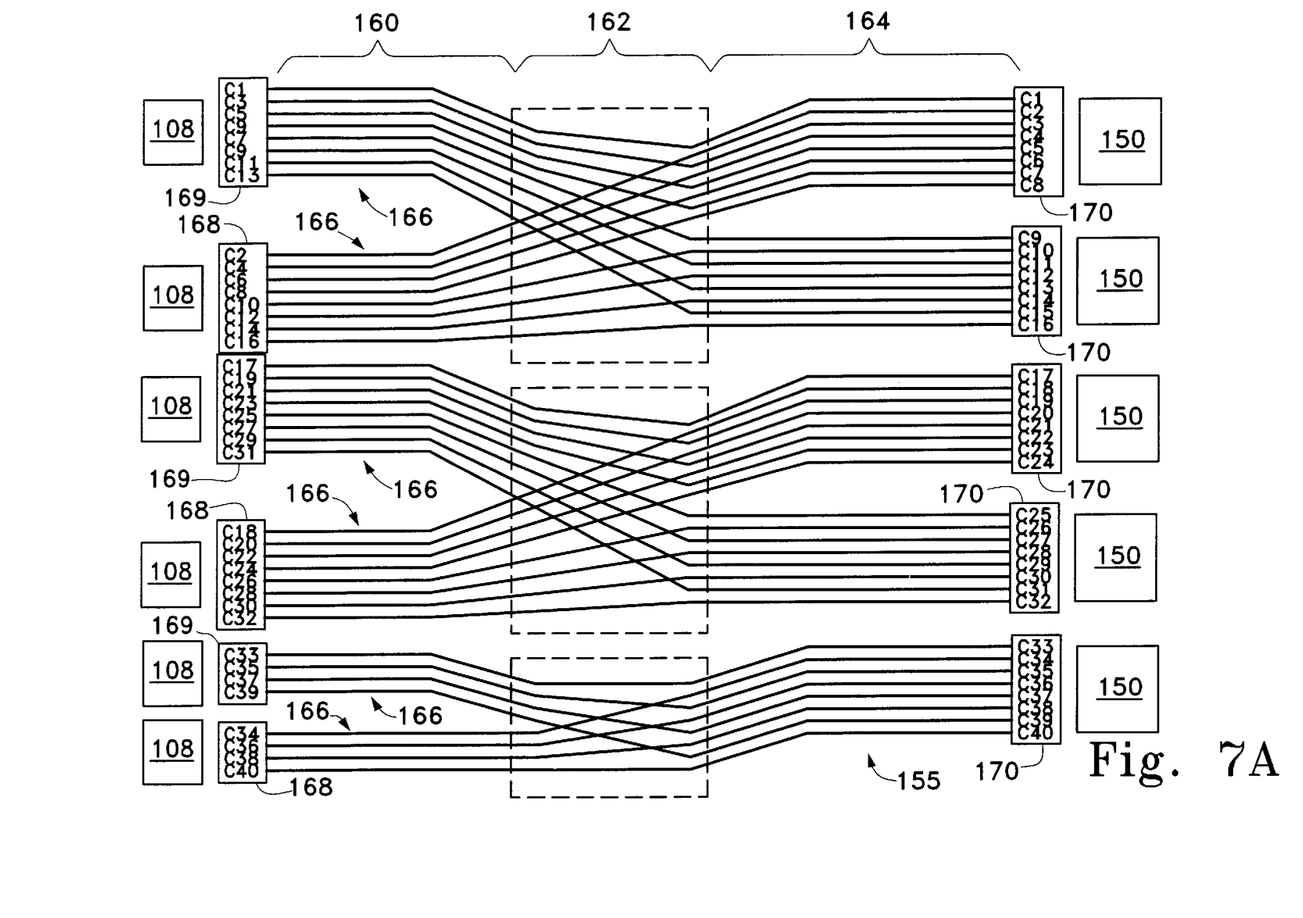
FIG. 7A illustrates a schematic representation of a 40 channel cable assembly.

FIG. 7A illustrates a schematic representation of a 40 channel cable assembly 155. As illustrated, the cable assembly 155 includes a proximal cable portion 160, a distal cable portion 164 and a transition region 162 separating the proximal and distal portions. The invention described herein includes attaching the proximal cable portion 160 to an optical device (not shown.) The proximal cable portion 160 may contain several sub-pluralities 166 of optical fibers. Each sub-plurality 166 is connected to a fiber array 108 connected to the optical device. It is contemplated that the sub-pluralities 166 may be connected to a single fiber array 108 or multiple fiber arrays 108. Each of the sub-pluralities 166 has a distinct channel order 168, 169 as shown. The each fiber in the distal cable portion 164 is grouped in distal channel orders 170. Eventually the optical fibers are connected to a second optical device 150. As noted above, the second optical device 150 may be a connector or splice which is connected to an actual optical device. FIG. 7A illustrates that as sub-pluralities 166 of optical fibers are re-configured (e.g., interleaved), the sub-pluralities 166 each form individual proximal channel orders 168, 169. As a result of the re-configuration, the proximal channel orders 168, 169 form a channel sequence that presents problems as discussed herein. Therefore, the optical fibers are re-ordered in the transition region 162 such that the distal channel order 170 matches a desired sequence. Also, the invention includes reordering or resequencing the optical fibers towards the end of the assembly having the first optical device. Accordingly, a standard ribbon having the desired channel order may be provided to a customer.

Figure 7B:
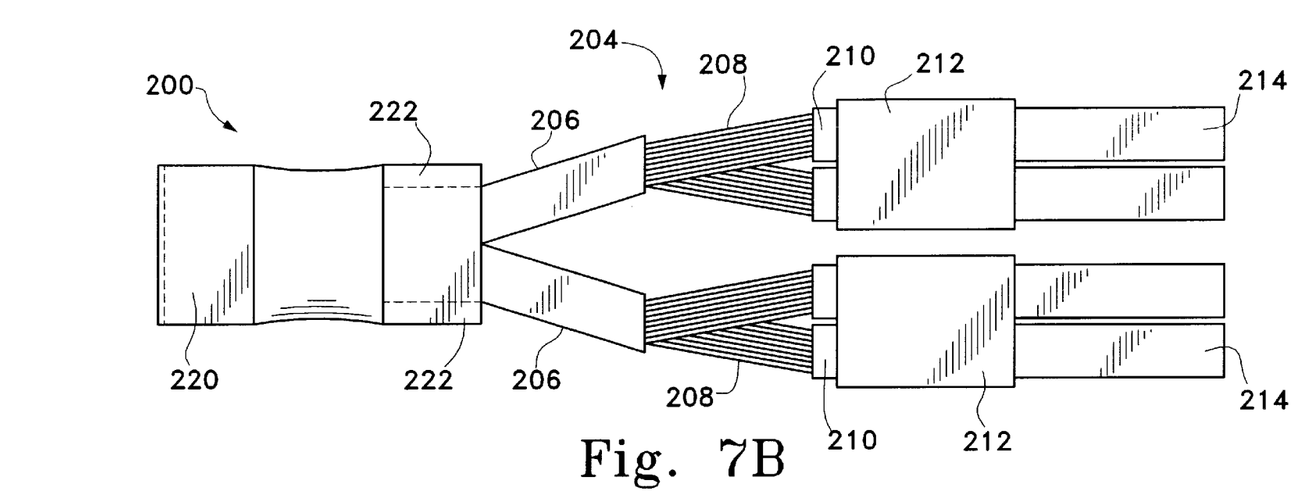
FIGS. 7B–7C illustrates an embodiment of the invention described herein having ribbons to accommodate 32 channels.

FIG. 7B illustrates a top view of a variation of the optical system 200 of the present invention. This variation illustrates an optical system 200 configured to accommodate 32 channels. The optical system 200 includes an optical device 202 and a cable assembly 204. In this example, the optical device 200 is a fiber array which may be joined to another optical device such as a PLC (not shown). The cable assembly 204 comprises a proximal cable portion 206, 208, and 210 having a ribbonized portion 206, singulated optical fibers 208 and another ribbonized portion 210. In this example, the singulated fibers 208 are left separated to facilitate placement of the cable assembly 204 as required. For example, leaving a portion of the proximal cable portion as singulated fibers 208 decreases the strain induced in the fibers as they are bent within a package. Providing the ribbonized portions 206, 208 provides an additional measure of protection for the fibers. It is contemplated that if this portion of the cable assembly 204 were to be placed outside of a package, then the entire proximal cable portion could be ribbonized. Moreover, although not shown, a portion of the proximal cable portion may extend into the fiber array 202.

The optical system 200 illustrated in FIG. 7B further illustrates a transition region 212 which reorders the fibers. As illustrated, the transition region 212 may be placed within a protective covering. In this illustration, the cable system 200 also comprises a distal cable portion 214 comprised of four individual ribbons each having 8 individual fibers which connect the optical system 200 to a customer's optical system (not shown).

Figure 7C:
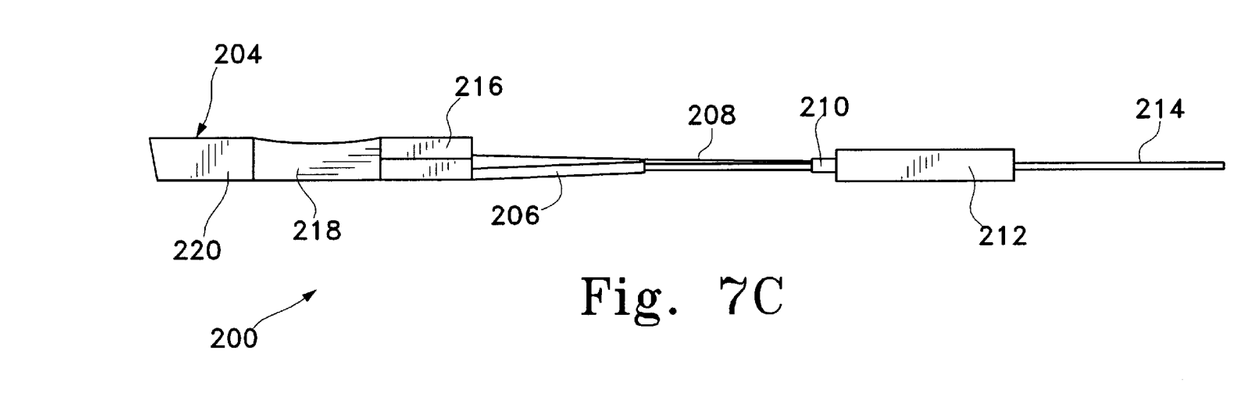

FIG. 7C shows a side view of the optical system 200 shown in FIG. 7B. As shown, the optical fibers in the proximal cable portion 206, 208, 210 are interleaved and extend from the fiber array 204 towards the transition region 212. Although not shown, the individual fibers are reordered in the transition region 212 and are eventually configured into 4 individual ribbons in the distal cable portion 214.

As mentioned above, the fibers may extend into the fiber array 204. In the variation shown in FIGS. 7B–7C, the fiber array 204 may have one or more covers 216 placed over portions of the fiber array 204. The fiber array 204 may also have strain relief portions 222. In one variation, the fibers may extend to an end of the fiber array 220 which may be covered by a glass, silicon, or combination material (not shown). In one variation of the invention, the fiber array may also have a UV curable epoxy in an end 220 where the fibers connect to the waveguides of the optical device (not shown), and a UV curable acrylate in the remaing portions 216, 218. The materials maybe configured to impart the desired protection for the device. For example, the UV epoxy may have a higher modulus than the UV acrylate.

Figure 7D:
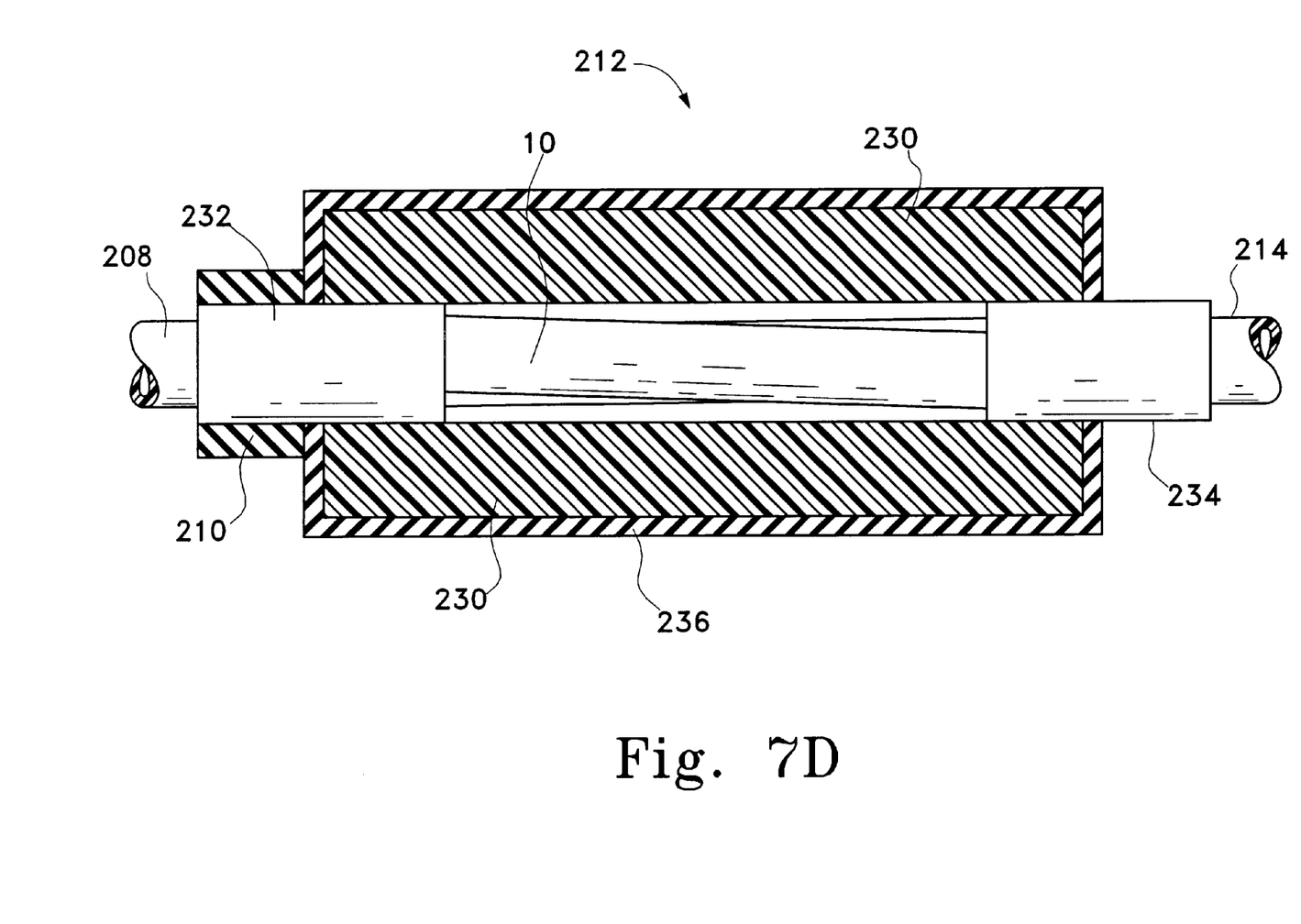
FIG. 7D illustrates a cross-sectional view of an example of a transition region of an assembly such as that illustrated in FIGS. 7B and 7C.

FIG. 7D shows a cross sectional view of the transition region 212 of the optical system of FIGS. 7B and 7C. Although it is not illustrated, the optical fiber 10 is reordered within the transition region 212. The fiber 10 may be placed between covering materials 230. The covering materials 230 may silicon, plastic, or glass. At either end of the transition region 212 the optical fibers may have a strain relief 232, 234, which may be, for example, a heat-shrink material. The transition region 212 assembly may be covered by an additional layer of material 236, which may be, for example, another heat shrink material. Also, the space between the covering materials 230 may contain a binding material, for example, a gel, or a polymer adhesive.

It is intended that the invention is not limited to re-ordering optical fibers from odd or even-numbered channel orders to numerical sequences. Instead, the present invention allows for any re-arrangement of the fibers to customize a cable assembly to select a desired distal channel order channel order given any proximal channel order. The division of the channels into odd and even groups and then back into a numerically ordered sequence is merely one possible customization of the channel orders that may be selected.

The invention also includes a method to re-order optical fibers to connect a first and a second optical device, using a ribbon having a proximal end and a distal end and a plurality of optical fibers extending therethrough. The method comprises the step of removing the plurality of optical fibers from the ribbon at the proximal end of the ribbon; re-ordering the plurality of optical fibers between the proximal and distal ends such that each fiber is in a different from its position in the ribbon; separating said plurality of optical fibers into at least two groups of optical fibers at said proximal end, and connecting each of said optical fibers to said first optical device; re-ribbonizing at least one portion of said proximal end of optical fibers; and connecting the distal end of the ribbon to the second optical device.

The re-ordering of the optical fibers results in a cable assembly with corresponding proximal and distal channel orders. One possible method includes re-ordering an optical ribbon having as few as two channels, or more than 80 (which is not an upper limit). The waveguide output from the first optical device is arranged in whatever is most suitable for device processing (e.g., 1, 2, 3, 4, 5 , . . . 79, and 80). In one variation of the invention, the customer will be able to splice the input/output ribbons directly to their system or utilize multiple fiber ribbons to connect to the input/output ribbons terminated with mating multiple fiber connectors.

The separating step may comprise removing a coating from at one optical fiber. This may be accomplished by a process selected from the group consisting of laser etching, radio-frequency plasma etching, reactive ion etching, chemical etching, and mechanical peeling. The separating step may comprise interleaving the optical fibers as illustrated in FIG. 3E.

The re-ribbonizing step described above may comprise joining the fibers with a material selected from the group consisting of: tape, polymer, glass, epoxy and metal.

As disclosed herein, it is preferred that the reordering section reorganizes the input/output channels conveniently within the PLC package. Another example of a method for producing the invention is to re-configure an input/output ribbon of optical fibers. During manufacturing, a section of the input/output fiber ribbons is left intact, and connected to the final output connectors (as described herein, the term "second optical device" includes optical connectors, splices, etc.) Individual fibers are separated from the ribbon by removing the backing of the ribbons along a portion of the ribbon to be contained within the PLC package. The backing of the ribbon imparts the rigidity typically associated with fiber ribbons. The individualized fibers, which still have the individual fiber acrylate coating, are rearranged according to a specified plan, and fixed in place with a binding material. The binding material could be epoxy, or Kapton, or any appropriate flexible material. It could be compatible with a hermetic package. The binding material can be further strengthened, such as with a supporting structure.

The transition region is where the individual fibers are reorganized along part or all of their length. A portion of the transition section may be left as individual fibers so that the fibers may be routed with less stress imparted by the bending of the fibers.

The purpose of the regrouped section is to route the fibers in the PLC package from the fiber array to the transition region. It is important to maintain fiber flexibility within the package, while providing for ease of handling during manufacture through reorganizing. Suitable reorganizing techniques include Kapton tape, other polyimide tapes, sleeves, and other commercially available methods.

In another variation of the invention, an outer polymer ribbon sleeve coating is stripped away from a segment of a ribbon of multiple optical fibers to allow for the re-organizing of each optical fiber along either the entire segment, or, at least a portion of the segment. In another variation, multiple optical fibers are a bundled or otherwise joined together in other than a ribbon configuration (e.g., a matrix of multiple rows of optical fibers, and so forth).

In yet another variation, a ribbon of optical fibers is held in a fixture such that only a segment of the ribbon is substantially exposed for coating removal and the ends of the ribbon are spooled into receptacles to avoid removal of any coating. The polymer removal process is preferably performed inside a radio-frequency plasma-sputtering chamber, but other types of removal (e.g., laser etching, reactive ion etching, chemical etching, mechanical peeling) are alternatively used to remove the outer coatings of the optical fibers that mechanically bundle the optical fibers together.

Radio-frequency plasma-sputtering chambers are available from MRC, located in Orangeburg, N.Y. (corporate headquarters); CHA Industries, located in Fremont, Calif. (corporate headquarters); and System Control Technology, located in Livermore, Calif. (corporate headquarters). Reactive ion etching chambers are available from Plasma Etch, Inc., located in Carson City, Nev. (corporate headquarters).

The optical fibers can be reorganized by using a tape (e.g., Kapton tapes, other polyimide tapes, or equivalent commercially available tapes). The area where the chosen group of optical fibers splits from the other remaining optical fibers can also be mechanically reinforced by using a tape or an adhesive (e.g., an epoxy, silicone rubber, polymer adhesive, and so forth). In another variation, the reorganizing process includes sliding a polymer or metal sleeve along the length of the chosen group of optical fibers to mechanically bundle them together.

Figure 8:
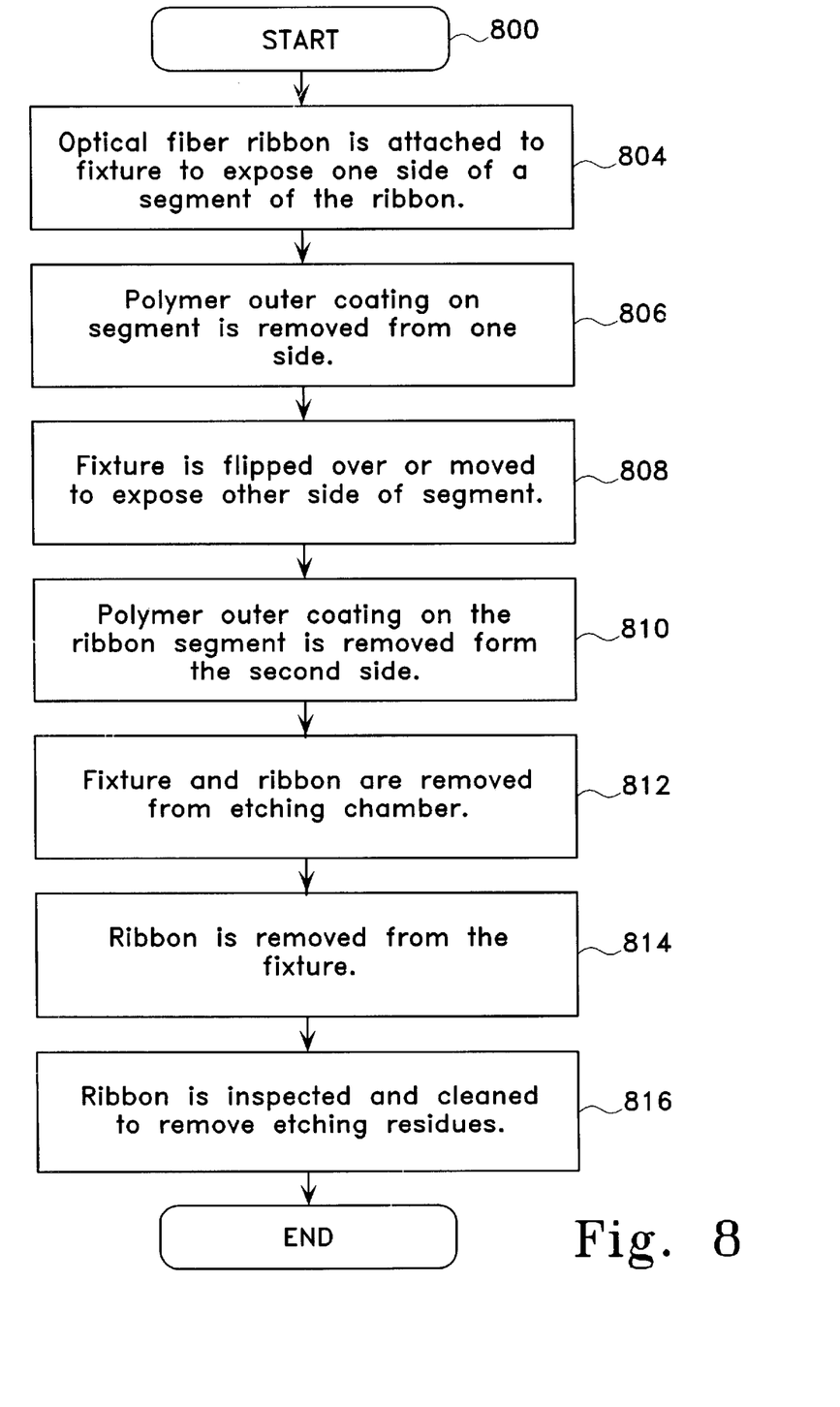
FIG. 8 illustrates a method in a flow chart form for the removal of the outer coating or coatings from a segment of a ribbon of optical fibers in accordance with one embodiment of the invention.

FIG. 8 illustrates a method 800 for the removal of the outer coating or coatings from a segment of a ribbon of optical fibers in accordance with one embodiment of the invention. The method starts in with operation 804, where the optical fiber ribbon is attached to a fixture in such a way that a segment of the ribbon is exposed by hole in the fixture. Next, the outer polymer coatings are removed from the segment of the ribbon (e.g., by laser, by reactive ion etching, by plasma-sputtering, chemical etching, mechanical peeling, or the equivalent) 806. In one variation of the invention, the fixture is made from a material that will be not interfere with the ribbon coating removal process (e.g., a non-magnetic material like ceramic, glass, aluminum, and so forth). In the next operation 808, the fixture is moved or rotated over so that the outer coating can be removed from the second side of the ribbon segment and removed around the entire circumference of each optical fiber. Next, in operation 810, the outer polymer coatings are removed from the other side of the segment of the ribbon. Next, the fixture and ribbon are removed from the etching chamber 812. In the next operation 814, the ribbon is removed from the fixture. In the final operation 816, the ribbon is inspected and cleaned to remove residues from the etching process that removed the outer polymer coating.

The exemplary embodiments described herein are for purposes of illustration and are not intended to be limiting. Therefore, those skilled in the art will recognize that other embodiments can be practiced without departing from the scope and spirit of the claims set forth below.

What is claimed is:

1. An optical system for connection to a distal optical device comprising:
   an optical device having a series of distinct optical channel waveguides, said optical channel waveguides connected to a cable assembly;
   said cable assembly comprising a proximal cable portion having a proximal end, a distal cable portion having a distal end, and a transition region separating said proximal portion and said distal portion;
   a plurality of optical fibers extending between said proximal and distal ends of said cable assembly, each fiber comprising a core surrounded by a cladding, and an outer coating surrounding said cladding along at least a portion of a length of said optical fiber, each of said optical fibers corresponding and optically connected to at least one distinct optical channel waveguide of said optical device;
   a proximal optical connecting region located at said proximal cable portion and adapted to connect said fiber cores to said optical channel waveguides of the optical device, wherein in said proximal optical connecting region said plurality of optical fibers are grouped into at least one sub-plurality of optical fibers, each sub-plurality having a proximal optical channel order defined by the order and position of said optical channel waveguides corresponding to each of said optical fibers in said sub-plurality;
   a distal optical connecting region located at said distal portion, wherein in at least a portion of said distal optical connecting region said plurality of optical fibers form at least one ribbon of optical fibers, and wherein each of said ribbons has a distal optical channel order defined the order and position of said optical channel waveguides corresponding to each of said optical fibers in said ribbon; and
   wherein in said transition region where said plurality of optical fibers are re-ordered from said distal cable portion to said proximal cable portion so that each said proximal and distal channel order are different.

2. The optical system of claim 1 wherein said transition region is sized to remain within an enclosure of said optical device.

3. The optical system of claim 1, wherein said at least one ribbons of optical fibers at said distal optical connecting region comprises at least two ribbons of optical fibers.

4. The optical system of claim 1, wherein along at least a portion of said proximal cable portion said plurality of optical fibers is re-ribbonized.

5. The optical system of claim 4, wherein said proximal cable portion is re-ribbonized into at least two ribbons.

6. The optical system of claim 5, wherein said proximal cable portion is re-ribbonized into at least four ribbons.

7. The optical system of claim 1, said coating surrounding said cladding on said optical fibers is removed from a point in said proximal optical connecting region to said proximal end.

8. The optical system of claim 1, wherein at least a portion of said proximal optical connecting region includes a bend in said optical fibers.

9. The optical system of claim 1, wherein at least a portion of said distal optical connecting region includes a bend in said optical fibers.

10. The optical system of claim 1, wherein at least a portion of said transition region includes a bend in said optical fibers.

11. The optical system of claim 1, wherein in at least a portion of said transition region said plurality of optical fibers are secured in place by a binding material.

12. The optical system of claim 11, wherein said binding material is flexible.

13. The optical system of claim 11, wherein said binding material is epoxy.

14. The optical system of claim 11, wherein said binding material is a polyimide.

15. The optical system of claim 11, wherein said binding material is polymeric.

16. The optical system of claim 1, wherein said plurality of optical fibers corresponds to at least 8 channels.

17. The optical system of claim 16, wherein said plurality of optical fibers corresponds to at least 16 channels.

18. The optical system of claim 17, wherein said plurality of optical fibers corresponds to at least 40 channels.

19. The optical system of claim 18, wherein said plurality of optical fibers corresponds to at least 80 channels.

20. The optical system of claim 19, wherein said plurality of optical fibers corresponds to more than 80 channels.

21. The optical system of claim 1, wherein each of said proximal optical channel orders corresponds to non-sequential channels and said distal optical channel order corresponds to sequential channels.

22. The optical system of claim 1, wherein said optical device is connected to said cable assembly using a fiber array, wherein said core of said fibers is inserted between said fiber array and a cover.

23. The optical system of claim 22 wherein said cover comprises a material selected from a group consisting of glass, silicon, or a combination thereof.

24. The optical system of claim 1, wherein said optical device comprises a planar lightwave circuit.

25. The optical system of claim 22, comprising at least two optical cable assemblies.

26. The optical system of claim 25, comprising at least three optical cable assemblies.

27. The optical system of claim 26, comprising at least four optical cable assemblies.

28. The optical system of claim 27, comprising more than four optical cable assemblies.

29. The optical system of claim 1, comprising a ribbon connector on said distal optical connecting region.

30. The optical system of claim 1, wherein said cable assembly exits from a feedthrough of an enclosure of said optical device.

31. The optical system of claim 30, wherein said cable assembly is clamped to said enclosure adjacent to said feedthrough.

32. The optical system of claim 30, further comprising a compliant insert at said feedthrough.

33. The optical system of claim 30, wherein said feedthrough is hermetically sealed.

34. The optical system of claim 33, wherein said feedthrough is hermetically sealed using a solder or sealant.

35. A package comprising an optical system for connection to a distal optical device, the package comprising:

an input connection optically coupled to an optical device;

an output connection optically coupled to a cable assembly;

the optical device having a series of distinct optical channel waveguides, the optical channel waveguides connected to the cable assembly;

the cable assembly comprising a proximal cable portion having a proximal end, a distal cable portion having a distal end, and a transition region separating the proximal portion and the distal portion;

a plurality of optical fibers extending between the proximal and distal ends of the cable assembly, each fiber comprising a core, each of the optical fibers corresponding and optically connected to at least one distinct optical channel waveguide of the optical device;

a proximal optical connecting region located at the proximal cable portion and adapted to connect the fiber cores to the optical channel waveguides of the optical device, wherein in the proximal optical connecting region the plurality of optical fibers are grouped into at least one sub-plurality of optical fibers, each sub-plurality having a proximal optical channel order defined by the order and position of the optical channel waveguides corresponding to each of the optical fibers in the sub-plurality;

a distal optical connecting region located at the distal portion, wherein in at least a portion of the distal optical connecting region the plurality of optical fibers form at least one ribbon of optical fibers, and wherein each of the ribbons has a distal optical channel order defined the order and position of the optical channel waveguides corresponding to each of the optical fibers in the ribbon; and wherein in the transition region where the plurality of optical fibers are re-ordered from the distal cable portion to the proximal cable portion so that the proximal channel order and the distal channel order are different.

36. The package of claim 35, wherein the package is hermetically sealed.

37. The package of claim 35, wherein the optical device comprises a planar lightwave circuit.

38. An optical system for connection to a distal optical device comprising:

a planar lightwave circuit having a series of distinct optical channel waveguides, the optical channel waveguides connected to a cable assembly;

the cable assembly comprising a proximal cable portion having a proximal end, a distal cable portion having a distal end, and a transition region separating the proximal portion and the distal portion;

a plurality of optical fibers extending between the proximal and distal ends of the cable assembly, each fiber comprising a core, each of the optical fibers corresponding and optically connected to at least one distinct optical channel waveguide of the planar lightwave circuit;

a proximal optical connecting region located at the proximal cable portion and adapted to connect the fiber cores to the optical channel waveguides of the planar lightwave circuit, wherein in the proximal optical connecting region the plurality of optical fibers are grouped into at least one sub-plurality of optical fibers, each sub-plurality having a proximal optical channel order defined by the order and position of the optical channel waveguides corresponding to each of the optical fibers in the sub-plurality;

a distal optical connecting region located at the distal portion, wherein in at least a portion of the distal optical connecting region the plurality of optical fibers form at least one ribbon of optical fibers, and wherein each of the ribbons has a distal optical channel order defined the order and position of the optical channel waveguides corresponding to each of the optical fibers in the ribbon; and wherein in the transition region where the plurality of optical fibers are re-ordered from the distal cable portion to the proximal cable portion so that the proximal channel order and the distal channel order are different.

* * * * *